United States Patent
Gonser

(10) Patent No.: US 10,615,411 B2
(45) Date of Patent: Apr. 7, 2020

(54) CHEMICAL LITHIATION OF ELECTRODE ACTIVE MATERIAL

(71) Applicant: Robert Bosch GmbH, Stuttgart (DE)

(72) Inventor: Andreas Gonser, Filderstadt-Plattenhardt (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 15/687,610

(22) Filed: Aug. 28, 2017

(65) Prior Publication Data

US 2018/0062168 A1    Mar. 1, 2018

(30) Foreign Application Priority Data

Aug. 30, 2016    (DE) .................. 10 2016 216 267

(51) Int. Cl.

| | |
|---|---|
| *H01M 4/38* | (2006.01) |
| *H01M 4/04* | (2006.01) |
| *H01M 10/0525* | (2010.01) |
| *H01M 4/134* | (2010.01) |
| *H01M 4/1395* | (2010.01) |
| *H01M 4/02* | (2006.01) |
| *H01G 11/50* | (2013.01) |

(52) U.S. Cl.
CPC ......... *H01M 4/386* (2013.01); *H01M 4/0404* (2013.01); *H01M 10/0525* (2013.01); *H01M 4/134* (2013.01); *H01M 4/1395* (2013.01); *H01M 2004/027* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 5,543,021 | A | 8/1996 | Yazami et al. |
| 7,776,473 | B2 | 8/2010 | Aramata et al. |
| 2007/0224509 | A1 | 9/2007 | Aramata et al. |
| 2015/0364795 | A1 | 12/2015 | Stefan et al. |

FOREIGN PATENT DOCUMENTS

| | | |
|---|---|---|
| DE | 102015121130 A1 | 6/2016 |
| WO | 2015127290 A1 | 8/2015 |

*Primary Examiner* — Sin J Lee
(74) *Attorney, Agent, or Firm* — Norton Rose Fulbright US LLP; Gerard Messina

(57) ABSTRACT

A method for manufacturing a electrochemical energy storage system that includes at least one current collector and at least one electrode, including, for example, and anode, that includes at least one prelithiated electrode active material, includes reacting the electrode active material with an organolithium compound of formula Li—R for the lithiation, moiety R being selected from the group consisting of: a linear or branched, saturated or unsaturated, preferably saturated, aliphatic or heteroaliphatic hydrocarbon moiety having 5 to 12 carbon atoms, which can include at least one heteroatom selected from Si, S, N, and O; a cycloaliphatic or heterocycloaliphatic hydrocarbon moiety having 5 to 12 carbon atoms, which can include at least one heteroatom selected from Si, S, N, and O; and an aromatic or heteroaromatic hydrocarbon moiety having 5 to 9 carbon atoms, which can include at least one heteroatom selected from Si, S, N, and O.

18 Claims, 1 Drawing Sheet

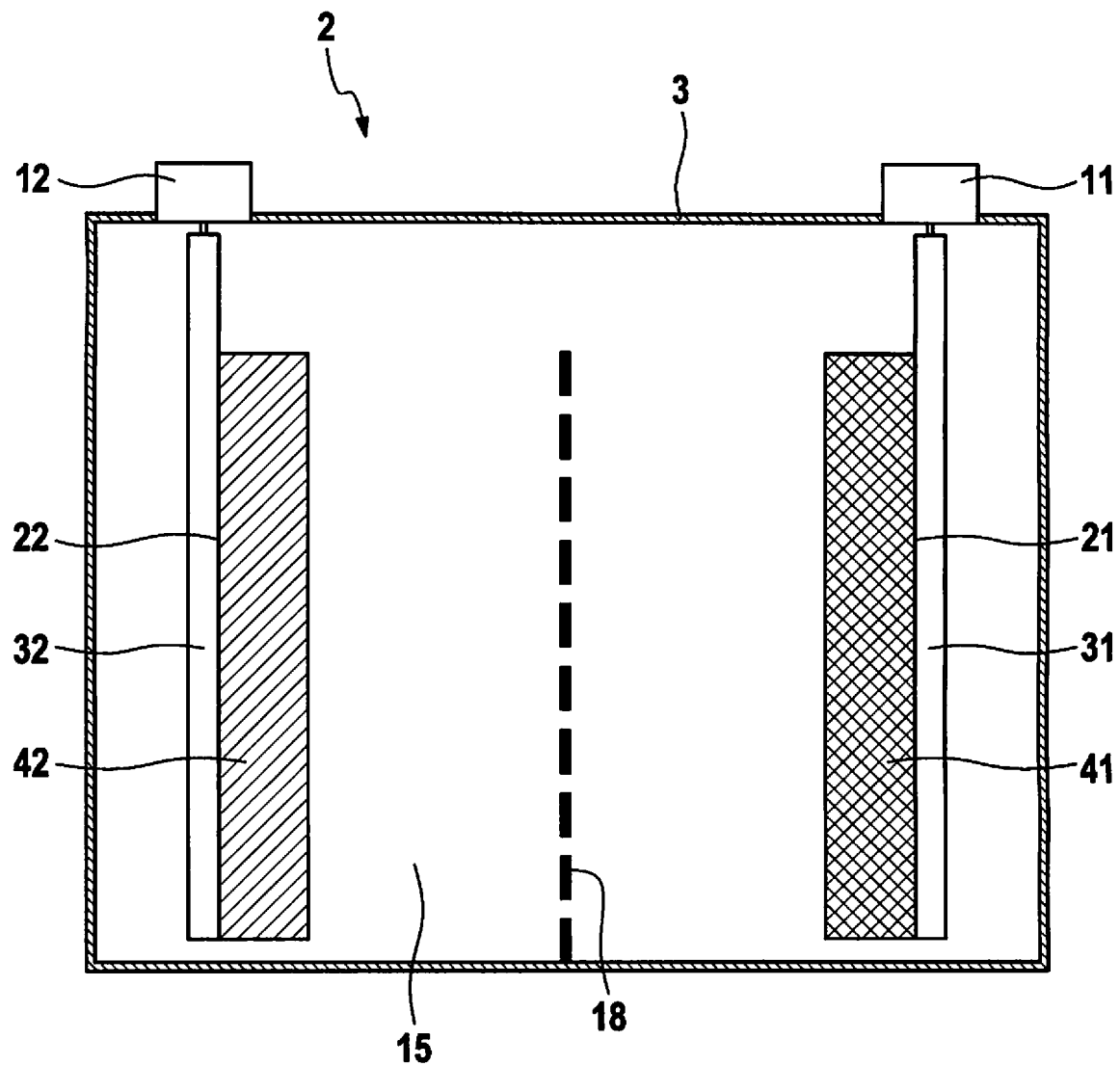

CHEMICAL LITHIATION OF ELECTRODE ACTIVE MATERIAL

CROSS-REFERENCE TO RELATED APPLICATIONS

The present application claims priority under 35 U.S.C. § 119 to DE 10 2016 216 267.5, filed in the Federal Republic of Germany on Aug. 30, 2016, the content of which is hereby incorporated by reference herein in its entirety.

FIELD OF THE INVENTION

The present invention relates to manufacturing of electrochemical energy systems, in particular for manufacturing lithium-(ion) batteries and for manufacturing lithium-containing hybrid supercapacitors, and also relates to a method of producing prelithiated electrode active material, the prelithiated electrode active material produced using the method, the electrode that is produced using the method, and the electrochemical energy storage system that is manufactured using the method.

BACKGROUND

Conventional electrochemical energy storage systems, such as lithium-ion batteries, frequently use graphite, which is characterized by a good Coloumb efficiency and a low charge loss in a first charging cycle, as anode material. With regard to the requirements for future energy storage systems, in particular in the area of electromobility, the use of anode materials having greater storage capacity is important. Silicon has these desired properties, but on the other hand it has lower cycle stability than graphite. It is known that this effect may be counteracted for lithiating the anode material.

U.S. Pat. No. 5,543,021 A provides a method for producing prelithiated carbon-containing anode materials and their use in electrodes for energy storage systems. Butyllithium and lithium naphthalide are used as lithiation reagents. The by-products that result during the lithiation are present as a gas or solid, and may therefore be problematic later in the process.

U.S. Pat. No. 7,776,473 B2 provides a silicon and silicon oxide composite that is doped with lithium. The composite is produced by reacting silicon oxide with metallic lithium. The slow diffusion of the solid lithium into the silicon oxide represents the rate-determining step of this reaction.

WO 2015/127290 A1 describes the surface modification of silicon-containing nanoparticles, using lithium-compounds, and the use of the modified nanoparticles as anode material in lithium-ion batteries.

SUMMARY

An object of the present invention is to provide a method for manufacturing electrochemical energy storage systems characterized in particular by a high storage capacity and cycle stability. An aim of the method is to avoid the problems from the related art, in particular with regard to safety aspects, and to be able to carry out the method using simple means. This object is achieved by the present invention described below.

An example embodiment of the present invention, relates to a method for manufacturing an electrochemical energy to a storage system, including at least one electrode, in particular one anode, that includes at least one prelithiated electrode active material and at least one current collector, the electrode active material being reacted with an organolithium compound of formula Li—R for the lithiation, R being selected from: a linear or branched, saturated or unsaturated (preferably saturated), aliphatic or heteroaliphatic hydrocarbon moiety having 5 to 12 carbon atoms, which can include at least one heteroatom selected from Si, S, N, and O; a cycloaliphatic or heterocycloaliphatic hydrocarbon moiety having 5 to 12 carbon atoms, which can include at least one heteroatom selected from Si, S, N, and O; and an aromatic or heteroaromatic hydrocarbon moiety having 5 to 9 carbon atoms, which can include at least one heteroatom selected from Si, S, N, and O.

Within the meaning of the present invention, electrochemical energy storage systems are energy storage systems whose energy storage principle is based on interaction of the lithium ions with the electrode active material of the electrodes of the energy storage system, and optionally with intercalation into this electrode active material in the form of an intercalation compound or alloy. In particular, lithium-(ion) batteries and hybrid supercapacitors are examples.

The electrode active materials according to the present invention include materials based on silicon and materials based on carbon.

Suitable silicon-containing electrode active materials are amorphous, micro- or nanocrystalline silicon and amorphous, micro- or nanocrystalline silicon alloys, including alloy components of tin and/or germanium.

Suitable carbon-containing electrode active materials are graphite, activated carbon, carbon nanotubes, or graphene, and mixtures thereof.

The electrode active material is particularly preferably a silicon-containing material, in particular amorphous silicon. This material has a particularly advantageous high storage capacity.

Within the meaning of the present invention, aliphatic hydrocarbon moieties or compounds are linear or branched, saturated or unsaturated compounds composed of carbon and hydrogen atoms. Heteroaliphatic hydrocarbon moieties or compounds additionally include at least one heteroatom selected from Si, S, N, and O.

Cycloaliphatic hydrocarbon moieties or compounds are correspondingly cyclic, optionally branched, saturated or unsaturated compounds composed of carbon and hydrogen atoms.

Heterocycloaliphatic hydrocarbon moieties or compounds additionally include at least one heteroatom selected from Si, S, N, and O.

Aromatic hydrocarbon moieties or compounds are cyclic compounds having a system of conjugated double bonds, i.e., delocalized electrons, and are composed of carbon and hydrogen atoms. Heteroaromatic hydrocarbon moieties or compounds additionally include at least one heteroatom selected from Si, S, N, and O.

In one preferred specific embodiment, a compound of formula Li—R is selected as the organolithium compound for lithiating the electrode active material, in which moiety R is selected from the group made up of: a linear or branched, saturated aliphatic hydrocarbon moiety having 5 to 9 carbon atoms; a linear or branched, saturated heteroaliphatic hydrocarbon moiety having 5 to 9 carbon atoms, and which includes at least one heteroatom selected from Si, S, N, and O; a cycloaliphatic saturated hydrocarbon moiety having 5 to 9 hydrocarbon atoms; a heterocycloaliphatic saturated hydrocarbon moiety having 5 to 9 hydrocarbon atoms hydrocarbon atoms, and which includes at least one heteroatom selected from Si, S, N, and O; a monocyclic aromatic hydrocarbon moiety having 5 to 9 carbon atoms;

and a monocyclic heteroaromatic hydrocarbon moiety having 5 to 9 carbon atoms, and which includes at least one heteroatom selected from Si, S, N, and O.

These compounds have the property that the hydrocarbon compounds of formula R—H that are formed during the reaction, or possibly as a by-product, can be removed from the product at a comparatively low temperature and/or reduced pressure.

In one preferred specific embodiment, moiety R is selected from the group made up of a pentyl moiety, a hexyl moiety, a heptyl moiety, an octyl moiety, a nonyl moiety, a phenyl moiety, a benzyl moiety, a 2-thienyl moiety, a 3-thienyl moiety, a 2-furanyl moiety, a 3-furanyl moiety, and an $R^1_3SiCH_2$ moiety, where $R^1$ is in each case independently selected from a linear or branched, saturated or unsaturated hydrocarbon moiety having 1 to 6 carbon atoms, in particular a methyl, ethyl, propyl, or butyl moiety.

The organolithium compound is preferably used in the form of a solution. Basically all solvents in which the organolithium compound has sufficient solubility are suited as solvents. With regard to the advantages that are to be achieved by selecting the organolithium compounds, particularly suited as solvents are hydrocarbon compounds of formula $R^2$—H, moiety $R^2$ being selected from the group made up of: a linear or branched, saturated or unsaturated, preferably saturated, aliphatic or heteroaliphatic hydrocarbon moiety having 5 to 12 carbon atoms, and which can include at least one heteroatom selected from Si, S, N, and O; a cycloaliphatic or heterocycloaliphatic hydrocarbon moiety having 5 to 12 carbon atoms, which can include at least one heteroatom selected from Si, S, N, and O; and an aromatic or heteroaromatic hydrocarbon moiety having 5 to 9 carbon atoms, and which can include at least one heteroatom selected from Si, S, N, and O.

However, it should be noted that, moiety $R^2$ in the solvent of formula $R^2$—H and moiety R in the organolithium compound of formula Li—R can have the same meaning, but in principle they can be selected independently of one another. Particularly preferred example solvents of formula $R^2$—H are hexane, cyclohexane, diethyl ether, and mixtures thereof. It should be ensured that the solvent is free of water in order to avoid an undesirable reaction of the organolithium compound with traces of water contained in the solvent.

The concentration of the organolithium compound in the solvent is preferably 0.1 mol/L to 3 mol/L, in particular 0.5 mol/L to 2 mol/L.

The lithiation reaction can in principle take place at any given point in time. Thus, for example, the prelithiated electrode active material can be produced first, and subsequently processed in the electrode. However, it is also possible to carry out the lithiation in a later method step.

Accordingly, in an example embodiment of the present invention, the method includes the following method steps: a) reacting the electrode active material with the organolithium compound of formula Li—R; b) removing the possibly unreacted organolithium compound of formula Li—R, the possibly resulting by-product R—H, and the solvent in order to obtain a prelithiated electrode active material; c) applying the prelithiated electrode active material to at least a portion of a surface of a current collector; and d) providing at least one electrochemical cell that includes at least two electrodes, at least one of the electrodes having been produced by the method according to method steps a) through c), and at least one separator that is situated between the at least two electrodes, the system made up of the two electrodes and the separator being inserted into a housing and being filled with an electrolyte composition in such a way that the electrodes and the separator are completely surrounded by the electrolyte composition.

In another preferred example embodiment, the method includes the following method steps: a) applying the electrode active material to at least a portion of a surface of a current collector; b) reacting the electrode active material applied to the current collector with the organolithium compound of formula Li—R; c) removing the possibly unreacted organolithium compound of formula Li—R, the possibly resulting by-product R—H, and the solvent in order to form an electrode containing prelithiated electrode active material; and d) providing at least one electrochemical cell that includes at least two electrodes, at least one of the electrodes having been produced by the method according to method steps a) through c), and at least one separator that is situated between the at least two electrodes, the system made up of the two electrodes and the separator being inserted into a housing and being filled with an electrolyte composition in such a way that the electrodes and the separator are completely surrounded by the electrolyte composition.

In another preferred example embodiment, the method includes the following method steps: a) applying the electrode active material to at least a portion of a surface of a current collector; b) providing at least one electrochemical cell that includes at least two electrodes and at least one separator that is situated between the at least two electrodes, the system made up of the two electrodes and the separator being inserted into a housing; c) filling the housing with the organolithium compound of formula Li—R to achieve lithiation of the electrode active material; d) removing the possibly unreacted organolithium compound of formula Li—R, the possibly resulting by-product R—H, and the solvent in order to form an electrode containing a prelithiated electrode active material; and e) filling the housing with an electrolyte composition so that the electrodes and the separator are completely surrounded by the electrolyte composition.

In any of the described method sequences, the assembly and installation can take place according to any known method that is suitable for this purpose. The reaction of the electrode active material with the organolithium compound of formula Li—R preferably takes place with exclusion of water and oxygen, in particular under a dry argon atmosphere. This prevents the occurrence of side reactions of the organolithium compound with the water or oxygen that may possibly arise. In any case, the prelithiated electrode active material is to be kept under a water-free atmosphere, for example under a water-free argon atmosphere or in a drying chamber at a dew point of <−30° C., preferably <−40° C., in particular <−50° C., in order to prevent a reaction of the prelithiated electrode active material with water from the air. The absence of oxygen is not absolutely necessary in this case.

A plurality of electrochemical cells are preferably combined with each other in a lithium-ion battery according to the present invention. For example, a lithium-ion battery includes 5 to 10 electrochemical cells.

In one preferred example embodiment, the electrochemical cells include two non-identical electrodes. One electrode includes the electrode active material that is prelithiated according to the present method. This electrode is also referred to as the negative electrode (frequently, often also as the anode). The other electrode is referred to as the positive electrode (frequently, often also as the cathode). This electrode includes, as the positive electrode active material, compounds that are able to reversibly accept and release lithium ions.

The positive active material can include a combined oxide that includes lithium as well as at least one metal selected from the group made up of cobalt, manganese, and nickel.

One specific example embodiment of the present invention contains a cathode active material that includes a compound of formula $LiMO_2$, where M is selected from Co, Ni, Mn, or mixtures thereof, and mixtures thereof with Al. $LiCoO_2$ is to be mentioned in particular.

In one preferred example embodiment, the cathode active material is a material that includes nickel, i.e., $LiNi_{1-x}M'_xO_2$, where M' is selected from one or more of the elements Co, Mn, and Al and $0 \leq x < 1$. Examples include lithium-nickel-cobalt-aluminum oxide cathodes (for example, $LiNi_{0.8}Co_{0.15}Al_{0.05}O_2$; NCA) and lithium-nickel-manganese-cobalt oxide cathodes (for example, $LiNi_{0.8}Mn_{0.1}Co_{0.1}O_2$; NMC (811), $LiNi_{0.33}Mn_{0.33}Co_{0.33}O_2$; NMC (111), $LiNi_{0.6}Mn_{0.2}Co_{0.2}O_2$; NMC (622), $LiNi_{0.5}Mn_{0.3}Co_{0.2}O_2$; NMC (532), or $LiNi_{0.4}Mn_{0.3}Co_{0.3}O_2$; NMC (433)).

Also to be mentioned as preferred positive active materials are superlithiated oxides, which are known to those skilled in the art. Examples of such are layered oxides of general formula $n(Li_2MnO_3) \cdot 1-n (LiMO_2)$, where M=Co, Ni, Mn, Cr and $0 \leq n \leq 1$, and spinels of general formula $n(Li_2MnO_3) 1-n (LiM_2O_4)$, where M=Co, Ni, Mn, Cr and $0 \leq n \leq 1$.

Also to be emphasized as suitable positive active materials are in particular spinel compounds of formula $LiM_xMn_{2-x}O_4$, where M=Ni, Co, Cu, Cr, Fe ($LiMn_2O_4$, $LiNi_{0.5}Mn_{1.5}O_4$, for example), olivine compounds of formula $LiMPO_4$, where M=Mn, Ni, Co, Cu, Cr, Fe ($LiFePO_4$, $LiMnPO_4$, for example), silicate compounds of formula $Li_2MSiO_4$, where M=Ni, Co, Cu, Cr, Fe, Mn ($Li_2FeSiO_4$, for example), tavorite compounds ($LiVPO_4F$, for example), $Li_2MnO_3$, $Li_{1.7}Ni_{0.17}Co_{0.1}Mn_{0.56}O_2$, and $Li_3V_2(PO_4)_3$.

If the lithiation rate of the prelithiated active material, based on the maximum electrochemically achievable lithium absorption capacity, is >50%, preferably >70%, in particular >90%, it is also possible to use lithium-free electrode active materials for the cathode. The maximum lithium absorption capacity refers to a value of 372 mAh/g with graphite as the electrode active material ($LiC_6$: corresponds to approximately 14 atom-% lithium). When silicon is used as the electrode active material, this refers to a value of 3579 mAh/g ($Li_{1.5}Si_4$: corresponds to approximately 79 atom-% lithium). Suitable electrode active materials for the cathode are in particular $MnO_2$, $MoO_3$, $MoS_2$, $TiS_2$, $V_2O_5$, $WoO_3$, sulfur, and oxygen (in the case of a design as a lithium-air battery).

As further components, the negative active material and/or the positive active material can include in particular binders such as styrene-butadiene copolymer (SBR), polyvinylidene fluoride (PVDF), polytetrafluoroethene (PTFE), carboxymethylcellulose (CMC), polyacrylic acid (PAA), polyvinyl alcohol (PVA), and ethylene propylene diene terpolymer (EPDM) in order to increase the stability of the electrodes. PVDF is particularly suited as a binder for graphite-containing active materials. Silicon-containing active materials are preferably processed with SBR, CMC, PAA, or PVA as binder.

In addition, conductive additives such as conductive carbon black or graphite can be added.

The current collector is made up of an electrically conductive material. Examples of suitable materials from which the current collector can be formed are copper, nickel, and alloys of these metals for the current collector of the anode, and aluminum, nickel, and alloys of these metals for the current collector of the cathode. Aluminum and copper are particularly preferred. The layer thickness of the current collector is not specifically limited. The current collector therefore preferably has a flat design in the form of a sheet or a foil. Since the current collector does not have to have stability-promoting properties and on the other hand increases the weight of the electrode, a thin design in the form of a foil is preferred. For example, the current collector has a layer thickness of 1 μm to 500 μm, in particular 5 μm to 30 μm.

The electrode active material composition can in principle be applied to the current collector using a method known from the related art. For example, this can take place by applying a slurry of an electrode active material composition, including an electrode active material, at least one binder, and optionally conductive additives in a solvent. It is also possible to form a separate electrode active material foil that is laminated onto the current collector. These methods are known in the related art.

The selection of a suitable binder and a suitable solvent for coating the current collector with the electrode active material composition is to be coordinated with the particular active material used. As mentioned above, PVDF is particularly suited as a binder for graphite-containing active materials. The PVDF binder is processed to form a paste, with N-methylpyrrolidone, for example, as solvent, and can subsequently be applied, for example, to the surface of a current collector. Silicon-containing active materials are preferably processed with SBR, CMC, PAA or PVA as binder in aqueous suspension. If active materials that are already prelithiated are to be processed, due to their high reactivity it should be ensured that the binders and solvents used are preferably inert with respect to the prelithiated active materials. Prelithiated silicon-containing active materials are preferably processed in anhydrous toluene with SBR as binder. Prelithiated graphite-containing active materials are preferably processed in anhydrous 1,3-dioxolane with PVDF as solvent.

If the electrode active material is applied to the current collector prior to the lithiation reaction, the portions of the electrochemical cell that have come into contact with the organolithium compound during the lithiation are preferably subsequently cleaned with a solvent to remove residues of the organolithium compound. The solvent is preferably the solvent $R^2$—H in which the organolithium compound used is dissolved.

The task of the separator is to protect the electrodes from direct contact with each other, thus preventing a short circuit. At the same time, the separator should ensure the transfer of the ions from one electrode to the other. Suitable materials are characterized in that they are formed from an insulating material having a porous structure. Suitable materials are in particular polymers such as cellulose, polyolefins, polyesters, and fluorinated polymers. Particularly preferred polymers are cellulose, polyethylene (PE), polypropylene (PP), polyethylene terephthalate (PET), polytetrafluoroethene (PTFE), and polyvinylidene fluoride (PVDF). In addition, the separator can include ceramic materials or can be made of same, provided that a substantial (lithium) ion transfer is ensured. Ceramics that include MgO or $Al_2O_3$ are to be mentioned in particular as materials. The separator can be made of a layer of one or more of the materials mentioned above, or also of multiple layers in which in each case one or more of the mentioned materials are combined with each other.

The electrolyte composition can be present in liquid form or also in solid form, i.e., as a so-called solid electrolyte. Suitable liquid electrolyte compositions include at least one solvent and at least one conducting salt each. Suitable solvents have sufficient polarity for dissolving the further components of the electrolyte composition, in particular the conducting salt or the conducting salts. Acetonitrile, tetrahydrofuran, diethyl carbonate, or γ-butyrolactone, as well as cyclic and acyclic carbonates, in particular propylene carbonate, ethylene carbonate, dimethyl carbonate, diethyl carbonate, ethyl methyl carbonate, and mixtures thereof are examples. Propylene carbonate, ethylene carbonate, dimethyl carbonate, diethyl carbonate, ethyl methyl carbonate, and mixtures thereof are particularly preferred.

In addition, the electrolyte composition includes at least one conducting salt. Lithium salts are particularly suited. The conducting salt can be selected, for example, from the group made up of lithium perchlorate ($LiClO_4$), lithium tetrafluoroborate ($LiBF_4$), lithium hexafluorophosphate ($LiPF_6$), lithium hexafluoroarsenate ($LiAsF_6$), lithium trifluoromethanesulfonate ($LiSO_3CF_3$), lithium bis(trifluoromethylsulfonyl) imide ($LiN(SO_2CF_3)_2$), lithium bis(pentafluoroethylsulfonyl) imide ($LiN(SO_2C_2F_5)_2$), lithium bis (oxalato) borate (LiBOB, $LiB(C_2O_4)_2$), lithium difluoro (oxalato) borate ($LiBF_2(C_2O_4)$), lithium tris (pentafluorethyl) trifluorophosphate ($LiPF_3(C_2F_5)_3$), and combinations thereof.

Polymer electrolytes are particularly suited as solid electrolytes. The polymer electrolytes include at least one polymer and at least one of the conducting salts mentioned above. Polyalkylene oxides such as polyethylene oxide (PEO) and polypropylene oxide (PPO) are example suitable polymers.

The housing can be made of any desired material, provided that it can be closed air-tight, for example. Metals, in particular aluminum, and plastics, in particular thermoplastics, including polyethylene, polypropylene, polystyrene, and/or polyethylene terephthalate, for example, are emphasized.

The specific embodiments mentioned above and the specific embodiments described in the exemplary embodiments are not subject to any particular limitations with regard to their size, shape, material selection, or technical design, so that the selection criteria known in the field of application can have unlimited applicability.

The method according to example embodiments of the present invention advantageously allows provision of an electrochemical energy storage system that already has prelithiated electrode active material, in particular anode material, prior to the first charging cycle. Charging losses during operation can be compensated for in this way.

The method also offers the advantage that the formation of gaseous and solid by-products such as butane or naphthalene is avoided due to the organolithium compounds used for the lithiation. The by-products that arise can be removed from the product using simple means if necessary. The safety of the manufacturing method and of the product is increased due to avoiding combustible gaseous by-products.

In contrast to conventional electrochemical lithiation methods, no external circuit is required.

Specific example embodiments of the present invention are explained in greater detail with reference to the drawing and the following description.

BRIEF DESCRIPTION OF THE DRAWING

FIG. 1 shows a schematic illustration of a battery cell.

DETAILED DESCRIPTION

An important element of the method according to the present invention is the lithiation of so-called negative electrode active material 41 (anode material). This can be a carbon- or silicon-containing material. Two examples of the lithiation are explained below.

Example 1

50 g polycrystalline silicon is added to 500 mL of a 2 M solution of phenyllithium in cyclohexane/diethyl ether (70/30) under an argon atmosphere, under agitation. The obtained suspension is agitated for 10 hours at room temperature. The prelithiated silicon is subsequently filtered off and washed with cyclohexane/diethyl ether (70/30). 7 g of the prelithiated silicon is processed with 2 g carbon black and 1 g SBR in toluene to form a paste. This paste is applied to both surfaces of a current collector 31 made of copper foil. The solvent is removed under reduced pressure. The electrode thus produced can be used as a negative electrode 21 in a lithium-ion battery.

Example 2

A mixture of 7 g silicon, 2 g carbon black, and 1 g polyacrylic acid (PAA) is processed with $H_2O$ to form a paste. This paste is applied to both surfaces of a current collector 31 made of copper. The solvent is removed under reduced pressure. The electrode thus produced is placed in a solution of n-hexyllithium in hexane (1.5 mol/L) at room temperature for 30 minutes under an argon atmosphere. The prelithiated electrode is subsequently washed with hexane, and after removal of any solvent residues may be used as a negative electrode 21 in a lithium-ion battery.

FIG. 1 schematically illustrates an electrochemical energy storage system 2, in the present case in the form of a battery cell. Energy storage system 2 includes a cell housing 3 having a prismatic, in the present case a cuboidal, design. In the present case, cell housing 3 has an electrically conducting design and is made of aluminum, for example. However, cell housing 3 can also be made of an electrically insulating material, for example plastic.

Energy storage system cell 2 includes a negative terminal 11 and a positive terminal 12. A voltage provided by energy storage system 2 can be tapped via terminals 11, 12. In addition, energy storage system 2 may also be charged via terminals 11, 12. Terminals 11, 12 are situated spaced apart from one another on a top surface of prismatic cell housing 3.

An electrode winding which includes two electrodes, namely, a negative electrode 21 and a positive electrode 22, is situated within cell housing 3 of energy storage system 2. Negative electrode 21 and positive electrode 22 each has a foil-like design, and are wound to form an electrode winding with a separator 18 situated in between. It is also conceivable to provide multiple electrode windings in cell housing 3. An electrode stack, for example, can be provided instead of the electrode winding.

Negative electrode 21 includes a negative active material 41 which has a foil-like design. The electrodes produced in Examples 1 and 2 may be used as negative electrodes 21.

Negative electrode 21 also includes a current collector 31, which likewise has a foil-like design. Negative active material 41 and current collector 31 are placed flatly against each other and joined together. Current collector 31 of negative electrode 21 has an electrically conductive design and is made of a metal, for example copper. Current collector 31 of negative electrode 21 is electrically connected to negative terminal 11 of energy storage system 2.

Positive electrode 22 includes a positive electrode active material 42 that is present in particle form. Additives, in particular conductive carbon black and binder, are situated between the particles of positive electrode active material 42. Positive electrode active material 42 and the stated additives form a composite which has a foil-like design.

In the present case, positive electrode 22 is a nickel-manganese electrode. Positive electrode 22 includes NCM (111) as positive electrode active material 42, which is present in particle form. Additives, in particular conductive carbon black and binder, are situated between the particles of positive electrode active material 42. Positive electrode active material 42 and the stated additives form a composite which has a foil-like design. Further components of positive electrode active material 42 are in particular PVDF binder, graphite, and carbon black.

Positive electrode 22 also includes a current collector 32 which likewise has a foil-like design. The composite, made up of positive active material 42, the additives, and current collector 32, are placed flatly against each other and joined together. Current collector 32 of positive electrode 22 has an electrically conductive design and is made of a metal, for example aluminum. Current collector 32 of positive electrode 22 is electrically connected to positive terminal 12 of energy storage system 2.

Negative electrode 21 and positive electrode 22 are separated from one another by separator 18. Separator 18 likewise has a foil-like design. Separator 18 has an electronically insulating design, but is ionically conductive, i.e., is permeable for ions, i.e., lithium ions.

Cell housing 3 of energy storage system 2 is filled with a liquid aprotic electrolyte composition 15 or with a polymer electrolyte. Electrolyte composition 15 surrounds negative electrode 21, positive electrode 22, and separator 18. Electrolyte composition 15 is also ionically conductive, and includes, for example, a mixture of at least one cyclic carbonate (for example, ethylene carbonate (EC)) and at least one linear carbonate (for example, dimethylene carbonate (DMC), diethyl carbonate (DEC), methyl ethyl carbonate (MEC)) as solvent, and a lithium salt (for example, $LiPF_6$, LiBOB) as additive.

What is claimed is:

1. A method for manufacturing an electrochemical energy storage system that includes (1) an electrode that includes a pre-lithiated electrode active material and (2) a current collector, the method comprising:
   (a) reacting an electrode active material with an organolithium compound of formula Li—R for a lithiation, wherein moiety R is a cycloaliphatic or heterocycloaliphatic hydrocarbon moiety having 5 to 12 carbon atoms.

2. The method of claim 1, wherein the hydrocarbon moiety includes at least one heteroatom selected from Si, S, N, and O.

3. The method of claim 1, wherein the electrode is an anode.

4. The method of claim 1, wherein moiety R is selected from the group consisting of:
   a cycloaliphatic saturated hydrocarbon moiety having 5 to 9 hydrocarbon atoms;
   a heterocycloaliphatic saturated hydrocarbon moiety having 5 to 9 hydrocarbon atoms hydrocarbon atoms, and which includes at least one heteroatom selected from Si, S, N, and O.

5. The method as recited of claim 1, wherein moiety R selected from the group consisting of:
   a pentyl moiety;
   a hexyl moiety;
   a heptyl moiety;
   an octyl moiety;
   a nonyl moiety;
   a decyl moiety;
   an undecyl moiety;
   a dodecyl moiety.

6. The method of claim 1, wherein the electrode active material is a silicon-containing electrode active material.

7. The method of claim 1, wherein the electrode active material includes elemental silicon, a silicon-containing alloy, or a silicon-containing composite.

8. The method of claim 1, further comprising:
   (b) removing an unreacted organolithium compound of formula Li—R, a resulting by-product R—H, and a solvent to form the pre-lithiated electrode active material;
   (c) applying the electrode including the pre-lithiated electrode active material to at least a portion of a surface of the current collector;
   (d) providing at least one electrochemical cell that includes the electrode, an additional electrode, and a separator between the electrodes;
   (e) inserting the two electrodes and the separator as a system into a housing; and
   (f) filling the system with an electrolyte composition in such a way that the electrodes and the separator are completely surrounded by the electrolyte composition.

9. The method of claim 1, further comprising:
   (b) applying the electrode active material to at least a portion of a surface of the current collector prior to step (a), wherein the electrode active material applied to the current collector is reacted with the organolithium compound of formula Li—R;
   (c) removing unreacted organolithium compound of formula Li—R, a resulting by-product R—H, and a solvent in order to form the electrode containing the pre-lithiated electrode active material;
   (d) providing at least one electrochemical cell that includes the electrode, an additional electrode, and a separator that is situated between the electrodes;
   (e) inserting the two electrodes and the separator as a system into a housing; and
   (f) filling the system with an electrolyte composition in such a way that the electrodes and the separator are completely surrounded by the electrolyte composition.

10. The method of claim 1, wherein the method includes the following method steps:
   (b) applying the electrode including the electrode active material to at least a portion of a surface of the current collector;
   (c) providing at least one electrochemical cell that includes the electrode, an additional electrode, and a separator that is situated between the electrodes;
   (d) inserting the electrodes and the separator as a system into a housing, wherein the organolithium compound of formula Li—R is filled into the housing after step (d) to thereby cause the reacting of step (a);

(e) removing unreacted organolithium compound of formula Li—R, a resulting by-product R—H, and solvent; and (f) filling the housing with an electrolyte composition so that the electrodes and the separator are completely surrounded by the electrolyte composition.

11. The method of claim 1, wherein the electrochemical energy storage system is a lithium-containing battery or a lithium-containing hybrid supercapacitor.

12. The method of claim 1, wherein the electrochemical energy storage system is a lithium-ion battery.

13. A method for manufacturing an electrochemical energy storage system that includes (1) an electrode that includes a pre-lithiated electrode active material and (2) a current collector, the method comprising:
(a) reacting an electrode active material with an organolithium compound of formula Li—R for a lithiation, wherein moiety R is an aliphatic or heteroaliphatic hydrocarbon moiety having 5 to 12 carbon atoms, and, wherein the hydrocarbon moiety is linear.

14. The method of claim 13, wherein the hydrocarbon moiety is saturated.

15. The method of claim 13, wherein the hydrocarbon moiety is unsaturated.

16. The method of claim 13, wherein the hydrocarbon moiety includes at least one heteroatom selected from Si, S, N, and O.

17. A method for manufacturing an electrochemical energy storage system that includes (1) an electrode that includes a pre-lithiated electrode active material and (2) a current collector, the method comprising:
(a) reacting an electrode active material with an organolithium compound of formula Li—R for a lithiation, wherein moiety R is a heteroaromatic hydrocarbon moiety having 5 to 9 carbon atoms, wherein the hydrocarbon moiety includes at least one heteroatom selected from Si, S, N, and O.

18. A method for manufacturing an electrochemical energy storage system that includes (1) an electrode that includes a pre-lithiated electrode active material and (2) a current collector, the method comprising:
(a) reacting an electrode active material with an organolithium compound of formula Li—R for a lithiation, wherein moiety R is an aliphatic hydrocarbon moiety having 5 to 12 carbon atoms, and wherein the hydrocarbon moiety is branched.

* * * * *